Figure 1:
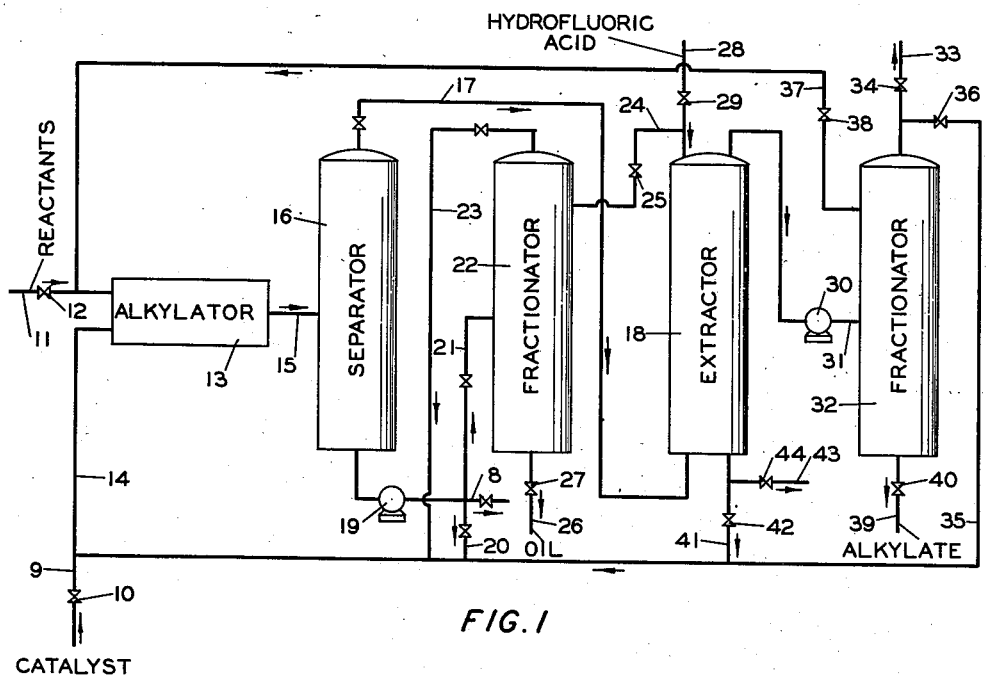

June 1, 1943.                    M. P. MATUSZAK                    2,320,629
                    TREATMENT OF PREDOMINANTLY SATURATED
                               HYDROCARBON MATERIALS
                               Filed May 26, 1941

INVENTOR
MARYAN P. MATUSZAK
BY
ATTORNEY

Patented June 1, 1943

2,320,629

UNITED STATES PATENT OFFICE 2,320,629

TREATMENT OF PREDOMINANTLY SATURATED HYDROCARBON MATERIALS

Maryan P. Matuszak, Bartlesville, Okla., assignor to Phillips Petroleum Company, a corporation of Delaware Application May 26, 1941, Serial No. 395,282

18 Claims. (Cl. 196—10)

This invention relates to the treatment of predominantly saturated hydrocarbon materials, and more particularly to the removal of organic fluorine compounds and other undesirable nonparaffin compounds from such materials by treatment with liquid hydrofluoric acid.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons into higher-boiling hydrocarbons in the presence of catalysts comprising one or more of such fluorine compounds as hydrofluoric acid, boron trifluoride, and the like. Polymerization yields a product that may be hydrogenated into saturated hydrocarbons in a subsequent hydrogenation step; alkylation yields a product comprised predominantly or entirely of saturated hydrocarbons. Although the exact nature or composition of the fluorine-containing by-products has not been definitely established, they are believed to be predominantly alkyl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture.

An object of this invention is to purify hydrocarbon materials. Another object of this invention is to remove nonparaffinic impurities from synthetic hydrocarbon materials. To remove undesirable organic fluorine-containing compounds from hydrocarbon materials is a further object of the present invention. Other objects and advantages will be apparent from the accompanying description and discussion.

According to this invention, removal of organic fluorine compounds and other undesirable nonparaffin compounds from hydrocarbon materials is effected by contacting the hydrocarbon material with liquid anhydrous hydrofluoric acid at a suitable temperature, which may be between about —100 and about 350° F., although ordinary or only slightly lowered temperatures will most often be found satisfactory, separating the hydrofluoric acid extract from the hydrocarbon material, and freeing the treated hydrocarbon material from a small proportion of dissolved hydrofluoric acid. The hydrofluoric acid should be used in sufficient amount to form a distinct liquid acid phase; preferably it should be at least several times this amount. The amount needed may vary with the content of fluorine-containing by-products, but the minimum amount may be readily found by trial; an amount between 20 and 100 per cent by volume of the hydrocarbon material is generally satisfactory, but for high contents of fluorine-containing by-products, it may greatly exceed 100 per cent. Because the mutual solubility of liquid hydrocarbons and liquid hydrofluoric acid increases appreciably with increase in temperature, elevated temperatures should sometimes be avoided. In some instances the treatment may be carried out at an elevated temperature, after which, for improved mechanical separation of the hydrocarbon material and the acid, the temperature may be lowered somewhat below the ordinary temperature, say to a temperature in the range of 10 to 50° F.

Separation of the acid and the hydrocarbon phases may be effected by gravity or by centrifugation. Freeing of the treated hydrocarbon material from dissolved hydrofluoric acid may be effected by various means, such as distilling, washing with water or alkali solutions, contacting with metal salts capable of combining with hydrofluoric acid, or the like.

In a modification of the process that is especially suited for the treatment of liquid hydrocarbon materials, such as motor fuels, kerosines, lubricating oils, and the like, a relatively low-boiling paraffin is added to the hydrocarbon material before, during, or after the contacting with the liquid hydrofluoric acid, and is advantageously added after the acid phase has been withdrawn. The resulting mixture is subsequently subjected to fractional distillation.

Such low-boiling hydrocarbons, which are preferably propane, a butane or a pentane, or a mixture of two or more of these, form minimum-boiling azeotropic mixtures with hydrofluoric acid, and with the proper conditions the overhead fraction will be such an azeotropic mixture. However, in actual plant practice such close control will often not be feasible, although the process will have taken advantage of this characteristic. The low-boiling fraction thus carries with it in the form of a low-boiling mixture, any hydrofluoric acid remaining in solution in the hydrocarbon materials, thereby effecting a removal of the dissolved acid without the loss of acid that would occur if the removal were made by water-washing, alkali-washing, or the like, and without the increase in temperature that would be necessary for removal of the acid by simple fractional distillation. Simple fractional distillation of the dissolved hydrofluoric acid, without prior addition of a relatively low-boiling paraffin, also may be practiced. The acid removed by either type of fractional distillation is generally suitable for re-use in the treatment of additional hydrocarbon material.

Although the action of the hydrofluoric acid is not completely understood at present, it appears to be due chiefly to a preferential solubility of organic fluorine and other nonparaffin compounds in the acid.

As olefins and other unsaturated hydrocarbons and nonolefin alkylating agents may react with hydrofluoric acid to form organic fluorine compounds, the hydrocarbon materials to be treated by the present process should be predominantly saturated. However, relatively small proportions of unsaturated hydrocarbons or alkylating agents may be present, for the fluorine compounds formed by reaction with the acid are preferentially dissolved by the acid and are removed; in consequence, the treated material is freed not only from organic fluorine compounds but also from unsaturated hydrocarbons and/or other alkylating agents.

As normally liquid paraffins on long contact with hydrofluoric acid apparently react slowly with the acid to yield some organic fluorine compounds, excessively long contacting should be avoided. Normally gaseous paraffins appear to be much more resistant to such reacting with the acid than normally liquid paraffins. For either liquid or liquefied gaseous hydrocarbon materials, any procedure that effects an intimate contacting between the acid and the hydrocarbon phases, such as those well-known in the art of extracting with preferential solvents, is suitable if the contacting is not unduly prolonged. Naturally, the contacting should preferably be effected in apparatus made of materials not subject to excessive attack by hydrofluoric acid; iron alloys containing nickel are especially suitable materials.

The invention will now be more particularly described and exemplified in connection with the two figures of the accompanying drawing, which are schematic flow-diagrams illustrating specific embodiments of the invention for the treatment of hydrocarbons produced by alkylation in the presence of hydrofluoric acid, which is a preferred alkylation catalyst.

In the embodiment of Figure 1, the alkylation reactants enter the system by one or more inlets, such as inlet 11 having control valve 12. These reactants preferably comprise a relatively low-boiling paraffin having at least one tertiary carbon atom per molecule, preferably isobutane, and an alkylating agent selected from the class consisting of olefins having three to six carbon atoms per molecule and of relatively polar nonprimary alkyl compounds, such as tertiary and secondary alcohols, halides, and the like, having three to six carbon atoms in at least one nonprimary alkyl group. For the sake of simplicity, in this description, the reactants may be taken to be isobutane and butylene, which are preferred alkylation reactants, without restricting the invention thereto. These reactants pass into alkylator 13, in which they are intimately mixed with hydrofluoric acid that enters through recycle conduit 14. Hydrofluoric acid, or other alkylation catalyst may be added when starting the process, or to make up any losses during operation, through conduit 9 controlled by valve 10. After a suitable contact period, the resulting alkylation mixture is passed through conduit 15 into separator 16, in which it is separated into a hydrocarbon phase and an acid phase. The hydrocarbon phase is passed through valved conduit 17 into treater or extractor 18. The hydrofluoric acid phase or other alkylation catalyst phase, may be discharged in part or entirely from the system through valved conduit 8, may be recycled, at least in part as by pump 19, through valved conduit 20 and acid-recycle conduit 14, back to alkylator 13; however, at least part of it is preferably passed through valved conduit 21 into fractionator 22. In this fractionator, the hydrofluoric acid phase is fractionally distilled into the following fractions: a light fraction, comprising chiefly isobutane, hydrofluoric acid, and some low-boiling organic fluorine compounds, that is passed through valved conduit 23 into acid-recycle conduit 14, by which it is recycled to alkylator 13; a relatively large medium fraction, comprising chiefly hydrofluoric acid, that is passed through conduit 24 having valve 25 into extractor 18; and a relatively small heavy or oil fraction, comprising chiefly acid-soluble organic compounds of relatively high molecular weight, including some fluorine-containing compounds, that is withdrawn through outlet 26 having valve 27. In extractor 18, the hydrocarbon phase entering from conduit 17 is contacted in a countercurrent manner with the hydrofluoric acid entering from conduit 24, whereby unreacted alkylating agent and organic fluorine-containing by-products of the alkylation step are removed from the hydrocarbon phase, presumably by preferential solution in the acid, in accordance with the principles of the invention. Hydrofluoric acid sufficient to compensate for any losses occurring anywhere in the system may be added through inlet 28 having valve 29; if desired, this make-up acid may be advantageously added to extractor 18 at a point downstream, in the hydrocarbon stream, to the point of entry of the hydrofluoric acid from fractionator 22. From extractor 18 the treated hydrocarbon material is forced, as by pump 30, through conduit 31 into fractionator 32, in which it is fractionally distilled into the following fractions: a relatively small light fraction that may be withdrawn through outlet 33 having valve 34 but that usually is passed, at least in part, to alkylator 13, as through conduit 35 having valve 36 and through recycle conduit 14, since it comprises not only isobutane but also the hydrofluoric acid that was carried in solution in the treated hydrocarbon material coming from extractor 18; a relatively large medium fraction that is practically acid-free and that is recycled to alkylator 13, as through conduit 37 having valve 38, since it comprises chiefly isobutane; and a heavy or alkylate fraction, comprising hydrocarbons boiling chiefly in the motor-fuel range, that is withdrawn through outlet 39 having valve 40 to storage or to additional processing steps, not shown. From extractor 18 the hydrofluoric acid extract is preferably passed through conduit 41 having valve 42 and through recycle conduit 14 to alkylator 13, to be used in the alkylation step; if desired, however, any part of the extract may be withdrawn from the system through outlet 43 having valve 44. The organic fluorine-containing by-products and the unsaturated hydrocarbons, doubtless in the form of alkyl fluorides, that are carried by this extract to alkylator 13 may enter, at least in part, into the alkylation reactions, thereby increasing the over-all yield of alkylate.

Figure 2:
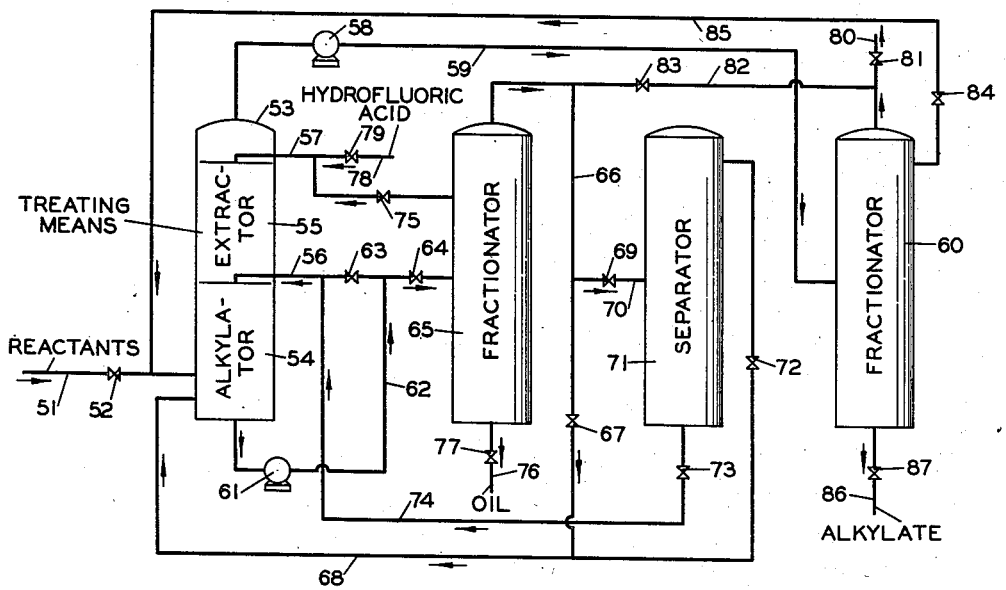

In the embodiment of Figure 2, the alkylation reactants, which again for the sake of simplicity may be taken to be isobutane and butylene, enter the system by one or more inlets, such as inlet 51 having control valve 52. They pass into treating means 53 in which they pass upwardly through a lower, alkylator section 54 and then through an upper, extractor section 55. In the alkylator section they are intimately contacted in a generally countercurrent manner with hydrofluoric acid that enters at the top of the alkylator section from acid-recycle conduit 56, whereupon alkylation occurs. On passing upwardly into and through the extractor section, the resulting hydrocarbon mixture is countercurrently contacted with relatively pure or fresh hydrofluoric acid that enters the upper part of the extractor section from conduit 57, whereupon organic fluorine-containing by-products of the alkylation, and any other undesirable nonparaffin compounds, are removed from the hydrocarbon mixture in accordance with the principles of the invention; incidentally, any unconsumed butylene or other olefin is also removed from the hydrocarbon mixture, probably in the form of alkyl fluorides. From the upper part of treating means 53, which extends upwardly somewhat beyond extractor section 55 to preclude substantial entrainment of the acid phase, the extracted hydrocarbon mixture is forced, as by pump 58, through conduit 59 into fractionator 60. The hydrofluoric acid entering treating means 53 from conduit 57 passes downwardly through extractor section 55 and then joins the somewhat less pure hydrofluoric acid entering from conduit 56. In alkylator section 54 the combined acid is intimately mixed with the alkylation mixture in any desired manner, but the general direction of the acid continues to be downward. From the bottom of the alkylator section, the acid is forced, as by pump 61, through conduit 62, valve 63, and conduit 56 back to the top of the alkylator section; however, instead of being thus recycled to the alkylation step, any desired part, or all, of it may be sent through valve 64 into fractionator 65. In fractionator 65, the acid is fractionally distilled into the following fractions: a light fraction, comprising chiefly isobutane, hydrofluoric acid, and some organic fluorine compounds, that is passed through conduit 66 partly or wholly, as desired, optionally through valve 67 and conduit 68 into the lower part of alkylator section 54 or through valve 69 and conduit 70 into separator 71, in which it is separated into a hydrocarbon phase that is passed through valve 72 and conduit 68 to the lower part of alkylator section 54 and into an acid phase that is passed through valve 73 and conduits 74 and 56 into the upper part of alkylator section 54; a relatively large medium fraction, comprising chiefly hydrofluoric acid, that is passed through valve 75 and conduit 57 into the upper part of extractor section 55; and a relatively small heavy or oil fraction that is withdrawn through outlet 76 having valve 77. Hydrofluoric acid sufficient in amount to compensate for any losses occurring anywhere in the system is added through inlet 78 having valve 79; if desired, this make-up acid may be advantageously added to extractor section 55 at a point downstream, in the hydrocarbon stream, to the point of entry of the hydrofluoric acid from fractionator 65. In fractionator 60, the extracted hydrocarbon mixture coming thereto through conduit 59 is fractionally distilled into the following fractions: a relatively small light fraction, comprising chiefly isobutane and hydrofluoric acid, that may be withdrawn, to avoid building up an excessive amount of relatively light gases in the system, through outlet 80 having valve 81 but that usually is passed, at least in part, through conduit 82 having valve 83 into conduit 66 and thence optionally to alkylator section 54 or to separator 71 as previously described; a relatively large medium fraction, comprising chiefly practically acid-free isobutane, that is recycled through valve 84 and conduit 85 to alkylator section 54; and a heavy or alkylate fraction, comprising hydrocarbons boiling chiefly in the motor-fuel range, that is withdrawn through outlet 86 having valve 87 to storage or to additional processing steps, not shown.

In the embodiments of Figures 1 and 2, all of the hydrocarbon mixture resulting from the alkylation step is shown to be extracted with hydrofluoric acid. Extraction of all of this hydrocarbon mixture, however, is not always necessary; in fact, certain advantages follow if only the liquid-hydrocarbon part or the actual alkylate is so extracted. Thus, after the alkylation and after separation of the hydrocarbon mixture from the acid phase, the hydrocarbon mixture may be passed into a debutanizing column, not shown, in which it is separated into a light fraction and an alkylate fraction. The light fraction, which comprises the normally gaseous hydrocarbons, the hydrofluoric acid dissolved in the hydrocarbon mixture, and some of the organic fluorine compounds, may be returned to the alkylation step; the alkylate fraction, which comprises the liquid hydrocarbons formed in the alkylation step, is extracted with liquid hydrofluoric acid to remove residual organic fluorine compounds and other undesired nonparaffin compounds. After being extracted, the alkylate may be freed from dissolved hydrofluoric acid in accordance with the description already given for the treatment of normally liquid hydrocarbons. The hydrofluoric acid extract is preferably sent to the alkylation step, but if desired, part or all of it may be passed into a fractionator, in which it is freed by fractional distillation from higher-boiling organic compounds and from which it may be returned to the extraction step or sent to the alkylation step. The hydrofluoric acid phase separated from the alkylation mixture may be recycled directly to the alkylation step, or part or all of it may be similarly fractionally distilled in the same or a different fractionator, from which it may be returned to the alkylation step or sent to the extraction step, as is desired.

The hydrofluoric acid used in the extraction should be concentrated, and in some instances may be substantially anhydrous. Generally any small, fortuitous amount of water will not be deleterious, and at times it may be desirable to ensure the presence of a few per cent of water. In nearly all cases, however, concentrated hydrofluoric acid will refer to acid having a strength greater than 90 per cent, and most generally greater than 95 per cent. The same will be true for the hydrofluoric acid used for alkylation.

By fractionator, as used in this specification, is meant any system of fractional-distillation devices that will effect the results indicated; it may consist of one or more than one fractionating column, as is found to be necessary or desirable for any particular case in accordance with the well-known art of fractional distillation. Many other well-known devices not specifically shown or described in this specification, which are known to contribute to or improve the attainment of the results indicated herein, may be incorporated or used without passing beyond the scope of this invention or the spirit of this disclosure.

The following examples are given for the purpose of illustrating some of the principles of the invention, without necessarily limiting it thereto.

Example I

Isobutane was alkylated, in the presence of anhydrous hydrofluoric acid, with a feed comprising butylenes. After the alkylation was completed, the hydrocarbon and the acid phases were allowed to separate. The hydrocarbon phase was washed with sodium hydroxide solution to remove free hydrofluoric acid, and it was then debutanized. The debutanizer overhead effluent contained 0.0225 per cent by weight of organically combined fluorine, as determined by burning an alkali-washed sample in a sulfur-determination lamp, absorbing the acid gases with sodium carbonate solution, and determining the fluorine in the resulting solution by titration with standard thorium nitrate solution in the presence of sodium alizarine sulfonate as indicator. Of this debutanizer effluent a portion of 115 parts by weight was contacted, in the liquid phase and at atmospheric temperature, with 110 parts by weight of liquid hydrofluoric acid for 1.5 hours. The hydrocarbon phase was separated from the acid phase, and it was washed with sodium hydroxide solution to free it from dissolved acid. Analysis of a sample showed that its fluorine content had been reduced by the extraction with hydrofluoric acid to only 0.0018 per cent; that is, the single-stage extraction removed 92 per cent of the organically combined fluorine. Obviously, repeated or continuous extraction would remove substantially all of the fluorine. The treatment for 1.5 hours in this example was longer than usually necessary; however, no deleterious effect appeared to be produced by the acid on the hydrocarbons, which, being normally gaseous, were relatively more resistant than normally liquid hydrocarbons.

Example II

Isobutane was alkylated as in Example I, and the resulting alkylate was debutanized by fractional distillation. The fraction of the alkylate boiling to 358° F. contained 0.0016 per cent by weight of organically combined fluorine. Contacting of 112 parts by weight of this fraction with 105 parts by weight of liquid hydrofluoric acid for 1.0 hour at atmospheric temperature increased the organic fluorine content to 0.0350 per cent by weight; contacting of 43 parts by weight with 40 parts by weight of acid for three minutes increased the organic fluorine content to 0.0140 per cent. These apparently unfavorable results were not entirely unexpected, for unsaturated hydrocarbons, either originally present or effectively, if not actually, formed by overlong contacting, would form alkyl fluorides. In practice, the treatment could be readily controlled, especially if it were continuous, to avoid overlong contacting. Contacting of 40.3 parts by weight of the sample first mentioned in this example, which had received the 1-hour treatment, with 40 parts by weight of hydrofluoric acid for three minutes reduced the organic fluorine content to 0.0173 per cent; that is, this second extraction removed 51 per cent of the organic fluorine. This result demonstrated that, if the contacting is properly conducted, treatment with hydrofluoric acid to remove organic fluorine compounds (and, incidentally, unsaturated hydrocarbons) is very effective for normally liquid hydrocarbon materials; repeated or continuous treatment would obviously remove substantially all of the organic fluorine.

These examples illustrate batch-type extraction, but continuous extraction is preferably practiced if the hydrocarbon material is present in large quantity or if the hydrocarbon material is continuously produced, as discussed in connection with the drawing. The continuous contacting may be concurrent and may be effected by any of several well-known mixing devices, but it is preferably countercurrent, so that fresh acid comes in contact with hydrocarbon material that has already lost most of its content of extractable compounds. As illustrated by the figures of the drawing and the corresponding description herein, the extract is advantageously used in the production of motor fuel by alkylation; part or all of the extract, however, may be withdrawn, as through outlet 43 of Figure 1, and treated, as by fractional distillation, to recover the hydrofluoric acid, which can then be returned for re-use in the extraction step.

An especially useful specific application of this invention is the treatment of the product of the alkylation of an isoparaffin with an alkylating agent in the presence of a fluorine-containing catalyst when the alkylation is effected under more or less drastic or adverse conditions. Among drastic alkylation conditions may be mentioned reaction temperatures appreciably above room temperature; among adverse, or non-optimum conditions may be mentioned a badly spent condition of the catalyst, an appreciable content of water in the catalyst, and the presence of refractory alkylating agents such as heavy polymers. Under such drastic adverse conditions, the alkylation tends to give a product containing a deleteriously high proportion of unreacted alkylating agent, heavy unsaturated hydrocarbons, and organic fluorine-containing compounds such as alkyl fluorides and complex addition products of the alkylating agent with the catalyst. Extraction of the product, either before or after separation from the unreacted isoparaffin, with hydrofluoric acid in accordance with this invention effects an excellent removal of these deleterious materials, thereby improving the paraffinicity and attendant properties of the alkylation product.

Because the invention may be practiced otherwise than as specifically illustrated and described, and because many modifications and variations within the spirit of the disclosure and scope of the invention of it will be obvious to those skilled in the art, the invention should not be unduly restricted by the foregoing specification and examples.

What is claimed is:

1. A process for the removal of organic fluorine compounds from predominantly saturated hydrocarbon materials containing the same, which comprises contacting such a hydrocarbon material with liquid hydrofluoric acid, separating the resulting hydrofluoric acid extract from the hydrocarbon material, and freeing the extracted hydrocarbon material from a small proportion of dissolved hydrofluoric acid.

2. A process for the removal of organic fluorine compounds from normally liquid predominantly saturated hydrocarbon materials containing the same, which comprises contacting such a hydrocarbon material with liquid hydrofluoric acid, separating the resulting hydrofluoric acid extract from the hydrocarbon material, and distilling from the extracted hydrocarbon material any residual, dissolved hydrofluoric acid.

3. A process of treating a normally liquid predominantly saturated hydrocarbon material containing organic fluorine compounds, which comprises adding to said material an appreciable amount of a relatively low-boiling paraffin, contacting the resulting mixture with liquid hydrofluoric acid, separating the resulting hydrofluoric acid extract from the hydrocarbon material, and freeing the extracted hydrocarbon material from the added paraffin and from dissolved hydrofluoric acid by fractional distillation.

4. A process of treating a predominantly saturated, hydrocarbon motor fuel containing organic fluorine compounds, which comprises contacting said motor fuel with liquid hydrofluoric acid, separating the resulting hydrofluoric acid extract from the motor fuel, adding to the extracted motor fuel an appreciable amount of a liquefied paraffin having three to five carbon atoms per molecule, and fractionally distilling the resulting mixture to remove the added paraffin and the hydrofluoric acid remaining dissolved in the motor fuel.

5. The process of claim 4, in which the added paraffin is normal butane.

6. The process of claim 1, in which the mixture of hydrocarbon material and hydrofluoric acid is cooled to a temperature in the range of 10 to 50° F. prior to separation of the hydrofluoric acid extract.

7. The process of claim 1, in which said hydrocarbon material is at least a part of a hydrocarbon mixture produced in the presence of a catalyst comprising at least one fluorine-containing compound.

8. The process of claim 1, in which said hydrocarbon material is at least a part of the hydrocarbon mixture resulting from alkylation of an alkylatable paraffin in the presence of a catalyst comprising at least one fluorine-containing compound.

9. The process of claim 1, in which said hydrocarbon material is at least a part of the hydrocarbon mixture resulting from alkylation of an alkylatable paraffin in the presence of hydrofluoric acid as alkylation catalyst.

10. The process of claim 1, in which said hydrocarbon material is at least a part of the hydrocarbon mixture resulting from alkylation of isobutane in the presence of hydrofluoric acid as the alkylation catalyst.

11. The process of claim 1, in which said contacting is countercurrent.

12. The process of claim 1, in which said hydrocarbon material is at least a part of the hydrocarbon mixture resulting from alkylation of at least one paraffin having at least one tertiary carbon atom per molecule in the presence of a catalyst comprising hydrofluoric acid, and in which said hydrofluoric acid extract is used as at least a part of said catalyst for the production of additional hydrocarbon material.

13. In a process of alkylating a paraffin having at least one tertiary carbon atom per molecule with an alkylating agent selected from the group consisting of olefins having three to six carbon atoms per molecule and of polar nonprimary alkyl compounds having three to six carbon atoms in at least one nonprimary alkyl group in the presence of a catalyst comprising hydrofluoric acid, the improvement which comprises extracting at least a part of the resulting alkylation hydrocarbon product with concentrated liquid hydrofluoric acid for a time that is sufficient for effecting substantial removal of organic fluorine-containing by-products of the alkylation without excessive destruction of normally liquid paraffins present in said product.

14. In a process of alkylating a low-boiling isoparaffin with a low-boiling olefin in the presence of hydrofluoric acid as alkylation catalyst, the improvement which comprises extracting at least a part of the resulting alkylation hydrocarbon product with concentrated relatively pure liquid hydrofluoric acid for a time that is sufficient for effecting substantial removal of organic fluorine-containing by-products of the alkylation without excessive destruction of normally liquid paraffins present in said product.

15. In a process of alkylating a paraffin with an alkylating agent in the presence of a fluorine-containing catalyst, the improvement which comprises extracting the alkylation product with liquid hydrofluoric acid.

16. In a process for the alkylation of a paraffin hydrocarbon in the presence of a hydrofluoric acid catalyst wherein the alkylate contains organic fluorine compounds, the improvement which comprises contacting in liquid phase a predominantly saturated hydrocarbon fraction containing an alkylate from an alkylation step with concentrated liquid hydrofluoric acid under conditions such that there is a negligible amount of reaction of hydrocarbons catalyzed by said hydrofluoric acid and such that there is a reduction in the content of organic fluorine compounds in said hydrocarbon fraction, separating a hydrocarbon phase and a hydrofluoric acid phase, passing at least a portion of said hydrofluoric acid phase as catalyst to an alkylation step for producing said alkylate, and removing dissolved hydrofluoric acid from said hydrocarbon phase.

17. An improved process for the alkylation of a paraffin hydrocarbon, which comprises alkylating an alkylatable paraffin in the presence of a hydrofluoric acid catalyst, passing a resulting mixture of hydrofluoric acid and hydrocarbons to separating means, separating a liquid hydrocarbon phase from liquid hydrofluoric acid, contacting said liquid hydrocarbon phase with substantially pure, concentrated liquid hydrofluoric acid to effect a purification of said hydrocarbon phase, passing liquid hydrofluoric acid effluent from said contacting to said alkylation, and removing dissolved hydrofluoric acid from a hydrocarbon phase effluent from said contacting.

18. An improved process for the alkylation of a paraffin hydrocarbon, which comprises passing a liquid mixture of an alkylatable paraffin and an alkylating agent to the lower part of a treating means comprising a lower alkylating zone and an upper extracting zone, passing to the upper part of said alkylating zone concentrated liquid hydrofluoric acid comprising recycled acid and acid from said extracting zone as hereinafter recited, intimately and countercurrently contacting said liquid mixture in said alkylating zone with said liquid concentrated hydrofluoric acid under alkylating conditions to effect alkylation of said alkylatable paraffin, withdrawing from the bottom of said treating means liquid hydrofluoric acid effluent from said alkylating zone and passing a portion of said acid as said recycled acid to said treating means at an intermediate part between said extracting zone and said alkylating zone, passing substantially pure concentrated liquid hydrofluoric acid to an upper part of said extracting zone, passing a liquid hydrocarbon mixture resulting from said alkylation upwardly from said alkylating zone into the lower part of said extracting zone, countercurrently and intimately contacting said pure hydrofluoric acid and said hydrocarbon mixture in said extracting zone, passing resulting liquid hydrofluoric acid from the lower part of said extracting zone to the upper part of said alkylating zone, passing the resulting extracted hydrocarbon mixture from the top of said extracting zone and from the top of said treating means, and recovering therefrom alkylated paraffin hydrocarbons so produced.

MARYAN P. MATUSZAK.